United States Patent

Betzing

[15] 3,659,683

[45] May 2, 1972

[54] ELECTROMECHANICAL SHIFTING DEVICE

[72] Inventor: Rudolf Betzing, Altendorfer Strasse 166a, 427o Altendorf-Ulfkotte, Germany

[22] Filed: Apr. 20, 1970

[21] Appl. No.: 30,110

[30] Foreign Application Priority Data

Apr. 25, 1969 Germany.......................P 19 21 252.3

[52] U.S. Cl..............................................188/162, 74/459
[51] Int. Cl........................................................F16d 65/34
[58] Field of Search............................74/459; 188/162, 171; 192/17 C, 18 B

[56] References Cited

UNITED STATES PATENTS

| 2,070,365 | 2/1937 | Leventis et al | 188/162 |
| 2,127,335 | 8/1938 | Hodgson | 188/171 |

FOREIGN PATENTS OR APPLICATIONS

| 77,699 | 8/1919 | Austria | 188/162 |
| 26,382 | 6/1923 | France | 188/162 |
| 1,255,855 | 1/1961 | France | 188/162 |

*Primary Examiner*—Duane A. Reger
*Attorney*—Michael S. Striker

[57] ABSTRACT

A plunger is adapted to transmit external work to a shifting member. A transmission comprises a screw having male screw threads, a nut which is formed with female screw threads which surround said male screw threads and define a helical guide path therewith, revolving elements disposed in said guide path between and guided by and coupling said male and female screw threads, means for continuously moving said revolving elements in and along said guide path and through the same and back into said guide path, and means holding said nut against rotation. Said transmission is adapted to transform a rotational drive movement of a motor shaft of an electric stop motor into a linear working movement of said plunger. A freewheel clutch is disposed between said motor shaft and said screw and adapted to rigidly couple said motor shaft and screw for rotation in one direction and to uncouple said motor shaft and screw for relative rotation in the opposite direction. Shock-absorbing means are disposed between a holder for the device and the shifting member. The periphery of the freewheel clutch substantially coincides with the periphery of an imaginary cylinder which is contiguous with said crests of said male screw threads.

8 Claims, 12 Drawing Figures

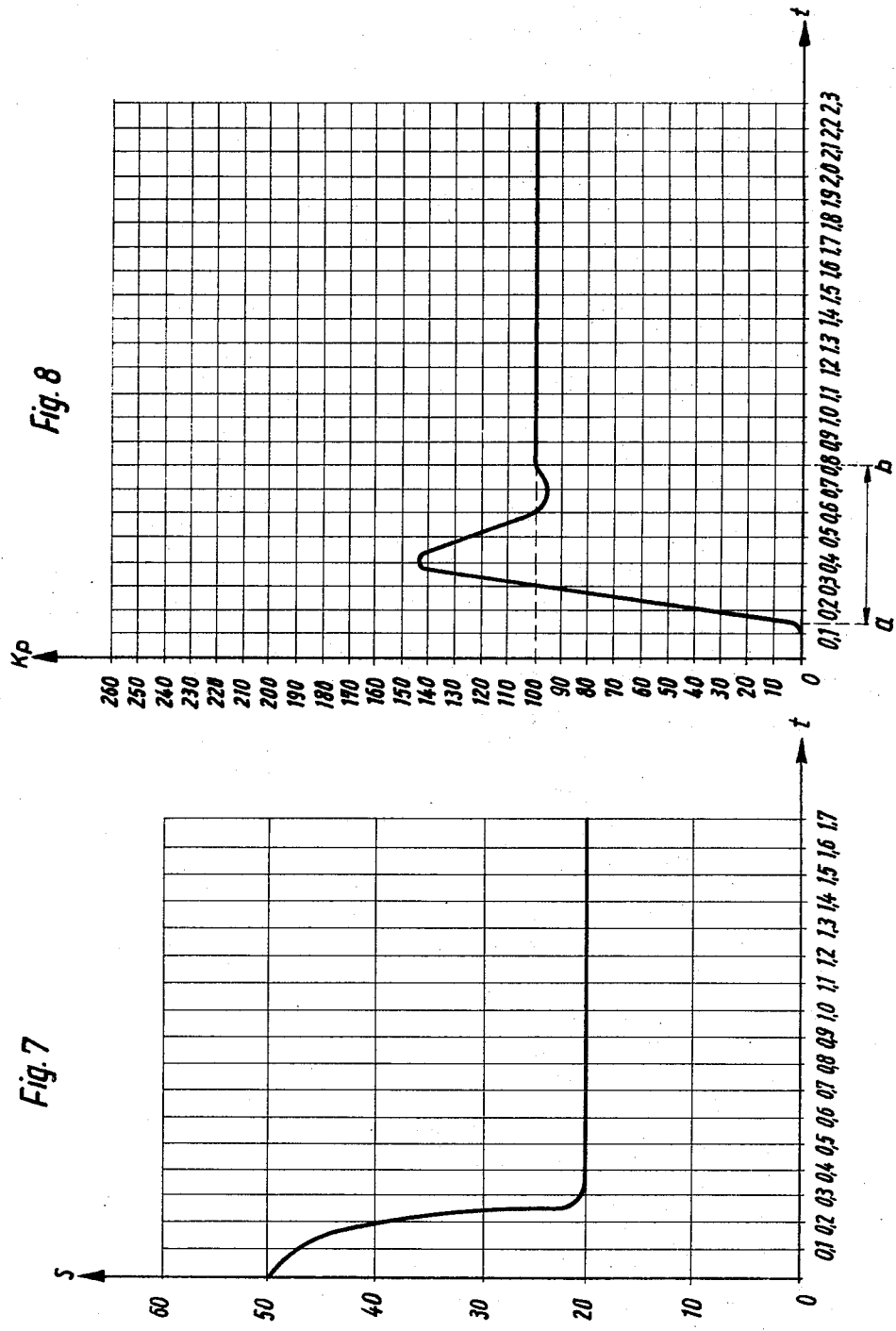

Inventor:
Rudolf Letzing.

ELECTROMECHANICAL SHIFTING DEVICE

This invention relates to shifting devices comprising means for transforming a rotational drive movement into a linear drive movement. Such devices have been disclosed particularly as electromechanical brake-lifting devices which comprise a stop motor, a revolving ball-screw transmission, and a freewheel. The freewheel eliminates the need for a stop, which would otherwise be required to take up the flywheel effect of the rotor of the motor, which effect is produced as a result of the relaxation of the compression spring of the shifting device, specifically of the brake-applying compression spring of a brake-lifting device, as soon as the motor has been de-energized so that the previously stressed spring is rendered effective, which in the brake-lifting device results in the application of the brake, whereby a further rotation of the movable parts of the shifting device is effected only under the action of the relaxing spring. Such stop would result in a transmission of forces to the revolving ball-screw transmission although the latter cannot take up such forces, particularly because any shocks would be most detrimental unless shock-absorbing means are provided.

This invention is based on the recognition that in spite of the considerable technical advantage which has been afforded before by the provision of damping devices for damping undesired forces, particularly in the form of shocks, additional measures are required to avoid the difficulties which are due to the fact that the desire to reduce the shifting times and to ensure faster movements results owing to the action of the square of velocity in flywheel effects which can no longer be controlled. Exact oscillographic observations have shown that it is not possible in the known shifting devices to eliminate the tendency of the entire system to vibrate as soon as the flywheel effect of the starting masses exceeds a lower limit. Such vibration is most undesirable because the shifting movement will not be terminated until these vibrations have died down entirely; in a brake-lifting device, this condition corresponds to the standstill of the elements to be braked. Hence, it is an object of the invention not only greatly to reduce the rotating masses but in addition to prevent the occurrence of any flywheel effect which cannot be suppressed without an occurrence of vibration. Whereas the above-mentioned damping means contribute to that object in that they suppress the occurrence of vibration to a large extent and virtually restrict the vibration to one swing having a small amplitude, damping means obviously do not influence the magnitude of the flywheel effect although they are fully satisfactory in view of their object because they were provided not only in the force-transmitting path within the device itself but also between the device and the parts to be shifted (shifting gear or brake rod linkage), on the one hand, and the stationary support on which the device was mounted. The damping means consisted mainly of friction springs, Belleville springs, cataracts, blocks and buffer of rubber or other elastomers, rubber springs, sandwich type connectors and other means known in the art concerned.

A further recognition resides in that freewheels are known per se but are entirely novel in the environment under discussion here and may be accommodated in a much smaller space than was required before. Based on that further recognition, the present invention is characterized in that the peripheries of the parts for transforming a rotational movement into an axial movement, inclusive of the parts of the freewheel, either coincide with an imaginary cylinder which is continuous to the crests of the screw threads or are outwardly spaced from said cylinder only by an insignificant distance, said distance being considered insignificant if the advantages are afforded which are due to the present invention and which will be specifically set forth hereinafter.

The concept of the invention may be realized in two basic ways. The freewheel is either accommodated within a section of the hollow motor shaft or in a core bore of the screw, which bore may be extended so that the screw is hollow or consists of an externally threaded tube. In this way it is possible without difficulty to meet the technical requirement that the peripheries of those parts which serve to transform the rotational movement into an axial movement, inclusive of the freewheel parts, should coincide with the imaginary cylinder or should be outwardly spaced from said cylinder only by an insignificant distance. Whereas the parts for transforming a rotational movement into an axial movement when designed in the usual manner can readily meet the above-mentioned requirement, they must be included in the consideration because, for instance, the screw end portion might be provided with an annular flange which is integral with or welded to the screw and the freewheel might be accommodated in such flange. The advantages of the invention could not be accomplished with such an arrangement. The provision of a flange at the end of the motor shaft and the provision of the freewheel within the cavity which is enclosed by the flange ring would also fail to give the results which can be produced by the invention. The reference to the parts for transforming the rotational movement into an axial movement is only directed to the active parts, which are directly driven, rather than to the parts which derive their movement from the first-mentioned parts.

The freewheel may be characterized in that freewheeling elements are provided which are very small in cross-section relative to their length so that they are similar to the needles of a needle bearing, the space requirement of the freewheel can be reduced virtually to any practicable value and the additional advantage results that the degree of filling of the freewheel is much better than in the previously used freewheels, in which the freewheeling elements were large in cross-section relative to their length so that the spaces between the freewheeling elements were large too, the degree of filling was much smaller and the engagement of the freewheel was much less reliable than is enabled in accordance with the invention.

It is finally pointed out that the freewheel enables a separation of the kinetic energy of the rotor of the motor from the screw so that there is no transmission of a residual torque which in the designs disclosed before the present invention is still present in a considerable magnitude. The damping means included in the force-transmitting path within the device are not yet effective when the motor is started, e.g., to lift a brake, so that the rotor of the motor can start under no-load conditions and the motor starts without a shock. Only after the motor has started under no load does the beginning axial movement of the screw result in a gradually increasing resistance in the damping means so that the spring (brake-applying compression spring) in the shifting device is stressed without a shock until the forces which are transmitted by the damping means are balanced by the opposing forces exerted by the spring as it is compressed. During this operation, the additional damping means provided between the shifting gear and the device and/or between the mounting of the device and the device will relax so that the starting time of the motor is equal to the time in which the last-mentioned damping means relax. In a brake-lifting device this operation results in a decrease of the braking force from the maximum value, which it possessed at the time when the motor was started, to zero before the brake shoes have completely disengaged the brake drum or brake disc that has been braked to a standstill. After the time required for the motor to start, the screw or a plunger formed by the screw and an extension of the screw will begin to move and this movement will continue until parts connected to the plunger contact a shock absorber which consists of elastic materials and which is suitably mounted on the inner boundary surface of that end member of the shifting device which is remote from the motor. The three-phase a.c. squirrel cage rotor of the stop motor remains stopped while being energized to its full nominal torque.

The adjustment of the shifting gear, consisting preferably of a brake rod linkage, is selected so that a full shifting of the shifting gear and a complete disengagement of the brake shoes is accompanied by a complete extension of the plunger, e.g., of a brake-lifting device. When a brake rod linkage has thus been adjusted, there will be no forces whatever in said linkage throughout the brake-lifting operation. Nevertheless, there is a sufficiently large wear allowance owing to the initial stress, which is due to the fact that when the plunger is retracted from its fully extended position the brake shoes will be in full engagement before the plunger reaches its initial position in which it had been when the motor was started. This initial stress must be distinguished from the initial stress with which the spring is initially installed. When the motor of a brake-lifting device is deenergized, the spring of the device or the brake-applying compression spring will accelerate the screw in the direction which is opposite to the direction of rotation of the screw during the preceding brake-lifting operation, as has been described hereinbefore, and the spring also accelerates the parts which are connected to the screw, until the brake shoes engage the part to be braked and thus terminate the movement of the plunger. In this operation, the freewheel prevents a transmission of force to the rotor of the motor from the parts which are accelerated by the relaxing spring of the device with a reversal of force and which serve to transform the rotational movement into an axial movement. Because in accordance with the invention the mass of the freewheel has been reduced to the practicable minimum, the mass of the remaining parts which rotate with the screw will be reduced too. This remark applies, above all, to the inner race of the generally used anti-friction bearing for the screw, because this inner race seats on the outer member of the freewheel so that the diameter of the inner race of the anti-friction bearing depends directly on the cross-section of the freewheel. The flywheel effect ($Wk^2$) of the screw and of the parts connected to it is strongly reduced in accordance to the invention and is taken up by the means which are included in the force-transmitting path within the shifting device. This will also eliminate the cause of the first-mentioned vibration, which occurs unless the reduction of the mass results in a reduction of the flywheel effect below the above-mentioned limit, above which a vibration cannot be avoided unless the parts being considered have excessive dimensions. Such excessive dimensions will not solve the problem because they would result in masses which are so large that the object of the invention cannot be accomplished. In other words, the invention enables an application of the braking force without any shock or vibration. This results in a deformation of the dampingmeans which are provided at the connections between the shifting device and the shifting gear and/or the support (foundation, frame, crane girder). Hence, all force actions decrease in accordance with the characteristics of the damping means which are connected in series in the force-transmitting path.

The drawing illustrates embodiments of the invention by way of example and the conditions which arise have been graphically represented in the form of oscillograms.

FIGS. 5 to 10 are oscillograms representing the previously obtained conditions and those obtained in accordance with the invention.

Figure 1:
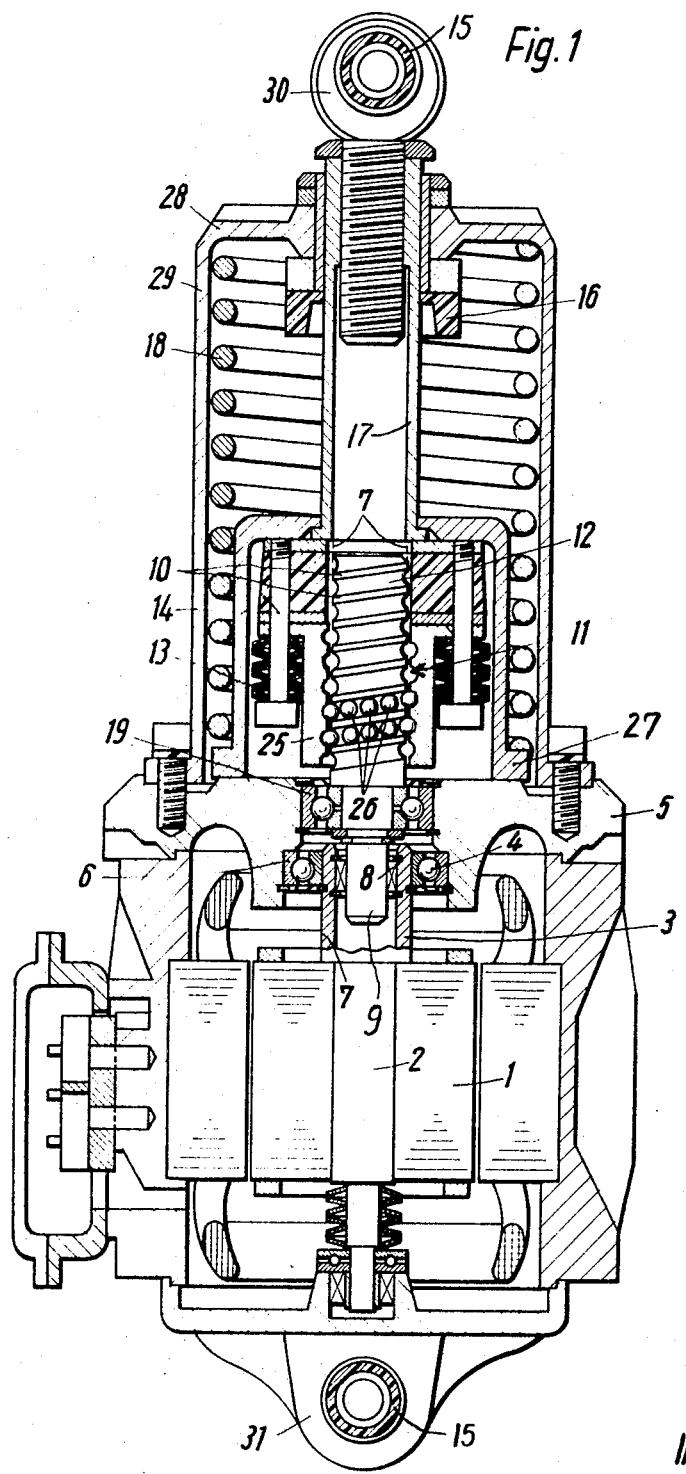
FIG. 1 is a vertical longitudinal sectional view taken through a shifting device consisting of an electromechanical brake-lifting device.

The embodiment of a brake-lifting device according to the invention shown in FIG. 1 comprises in known manner a drive motor, which has a rotor 1 and a shaft 2. The rotor shaft 2 of the motor comprises a hollow section 3. The outside periphery of the section 3 of the hollow shaft is engaged by an anti-friction bearing 6 in the form of a ball bearing, which comprises balls 4. The inner race of the anti-friction bearing 6 directly encloses the outside periphery of the hollow shaft section 3. The entire anti-friction bearing is accommodated in the lower end member of the housing of the brake-lifting device. That lower end member also forms the upper end member of the motor. The hollow shaft section 3 also forms the outer housing of a freewheel 8, which can be accommodated within the hollow shaft section 3 because its freewheeling elements, not shown, are very small in cross-section relative to their axial length so that they are almost similar to needles of a needle bearing. This design enables the provision of a freewheel 8 having a very high degree of filling because the needlelike freewheeling elements closely succeed each other. The higher degree of filling greatly increases the reliability of the freewheel. The freewheel is designed to transmit a torque applied to it when the rotor is moved in a sense to lift the brake, which is not shown. Such movement of the rotor is transmitted by the freewheel to a journal end portion 9 of a screw 12, of a revolving ball-screw transmission 11. The drawing shows clearly that the hollow section 3 of the motor shaft 2 is only slightly larger in diameter than that portion of the shaft 2 which carries the rotor 1. A comparison with an imaginary cylinder 7 which is contiguous to the crests of the screw threads 10 of the screw 12 shows that the outside periphery of the hollow shaft section 3 virtually coincides with that cylinder or is outwardly spaced therefrom only by an insignificant distance so that the advantages represented in FIGS. 9 and 10 of the drawing are substantially obtained.

In other respects, the electromechanical brake-lifting device which is shown is substantially known. The journal 9 joins the above-mentioned screw 12, which forms part of a revolving ball-screw transmission 11. The latter transmission comprises a nut 25 and balls 26. A rotation of the screw 12 will be transmitted by the screw threads 10 and the balls 26 to the nut 25, which is held against rotation and for this reason is constrained to perform an axial movement. During a lifting operation, the nut 25 engages the damping means 14 first and the latter do not become effective immediately so that the rotor 1 is started under no load. The load torque which is building up results in a compression of the elastically yielding damping material of the damping means 14 so that the abutment pot 27 for the brake-applying compression spring 18 of the device is lifted to stress the spring. This stressing begins at the time at which the opposing forces produced by the damping means 14 balance the forces which tend to stress the spring 18. Additional damping means are provided in the form of a series of Belleville springs 13. Although in most cases the full stroke of the revolving ball-screw transmission 11 is not required, an impact of the spring abutment 27 on the upper end portion 28 of the housing 29 of the brake-lifting device is prevented by a shock absorber 16, which precedes the inner boundary surface of the upper end portion 28. Further details of the brake-lifting operation will become apparent upon a consideration of the foregoing explanations.

The pot 27 and an extension 17 thereof form the plunger of the device. The plunger also comprises an eye member 30, which is secured in the extension 17 by a screw. Additional connecting eyes of the device are indicated at 31. All connecting eyes are bushed. The bushings 15 consist also of elastically yielding materials to exert a strong damping action.

As soon as the brake-lifting motor comprising the rotor 1 is de-energized, the previously compressed spring 18 of the brake-lifting device will relax and cause the plunger 27, 17 to be downwardly retracted whereas the plunger had moved upwardly to lift the brake. The downward retracting movement of the plunger is axially accelerated by the strong spring until a limit is reached which is determined by the brake rod linkage or the brake shoes. The retracting movement will be terminated when the brake shoes have contacted the brake drum or disc under the full braking force. The revolving ball-screw transmission 25, 26, 10 imparts a rotational movement to the screw 12 in a sense which is opposite to the sense of the previous brake-lifting movement. The freewheel 8 now prevents a transmission of the movement of the screw to the rotor 1, which was stopped when the motor was de-energized at the end of the brake-lifting operation. During this operation the fact that the flywheel effect is minimized in accordance with the invention has particularly desirable results because the flywheel effect is so small that it can readily be taken up by the damping means 14 so that the aperiodic vibration which was previously inevitable in such devices can no longer arise. The member to be braked is engaged without shock by the brake shoes, which are actuated by the brake rod linkage connected to the plunger eye 30. During that operation, the damping means 15 are deformed by the relaxing spring 18 so that the force of the spring 18 is dissipated without shock or vibration in accordance with the characteristic curve of the damping means 13, 14 connected in series in the force-transmitting path.

Figure 2:
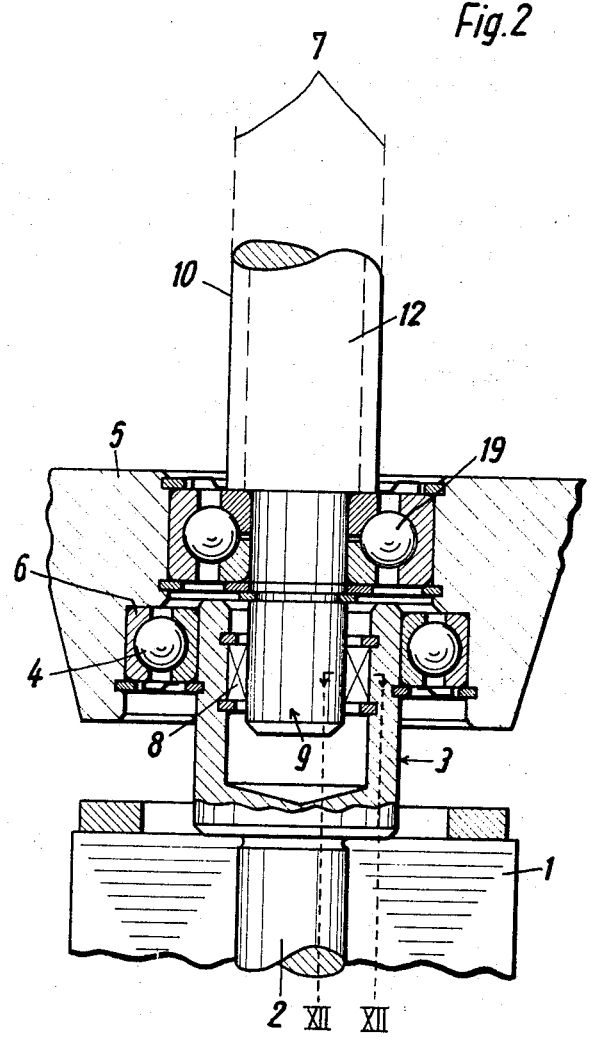
FIG. 2 is an enlarged view showing the design of the freewheel and of those parts of FIG. 1 which are associated with the freewheel, which is accommodated in a hollow section of the motor shaft.

FIG. 2 is an enlarged view illustrating those parts of FIG. 1 which are essential for the technical advance afforded by the invention. It is apparent that an anti-friction bearing 19 is provided in the form of a four-point bearing in addition to the anti-friction bearing 4, 6. This design of the bearing 19 is indicated by double arrows on the level of the parting line of the inner race of the anti-friction bearing 19. In practice, the halves of the inner race snugly contact each other. The screw threads 10 of the screw 12 have been diagrammatically represented in FIG. 2 in order to represent the imaginary cylinder 7, which shows that those parts which serve to transform the rotational movement into an axial movement, inclusive of the freewheel 8, are disposed within that cylinder. Only a part of the hollow shaft section 3 is disposed outside that cylinder but this fact is not significant because the rotor 1, the motor shaft 2 and the hollow shaft section 3 succeed the freewheel 8 in the path of the retracting force so that the flywheel effect of these parts is not significant for the braking operation and cannot give rise to undesirable vibration as the brake is applied.

Figure 3:
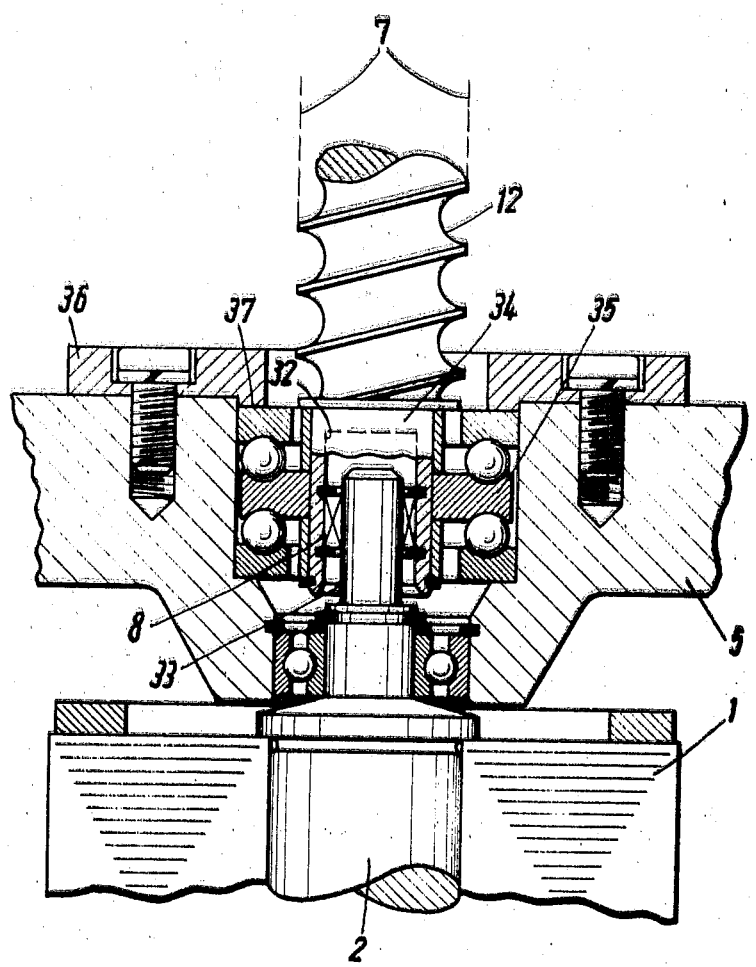
FIG. 3 shows an embodiment of the invention with the freewheel accommodated in a core bore of the screw.

FIG. 3 is an enlarged view showing another embodiment of the invention. The freewheel 8 is now accommodated in a core bore 32 of the screw 12 so that the hollow shaft section 3 shown in FIG. 1 is replaced by a journal end portion 33 of the rotor shaft 2 of the motor. The journal end portion 33 is also received by the core bore 32. The outside periphery of the screw end 34 is engaged by an anti-friction bearing 35, which is held in position by a flange ring 36 having an annular lip 37.

Figure 4:
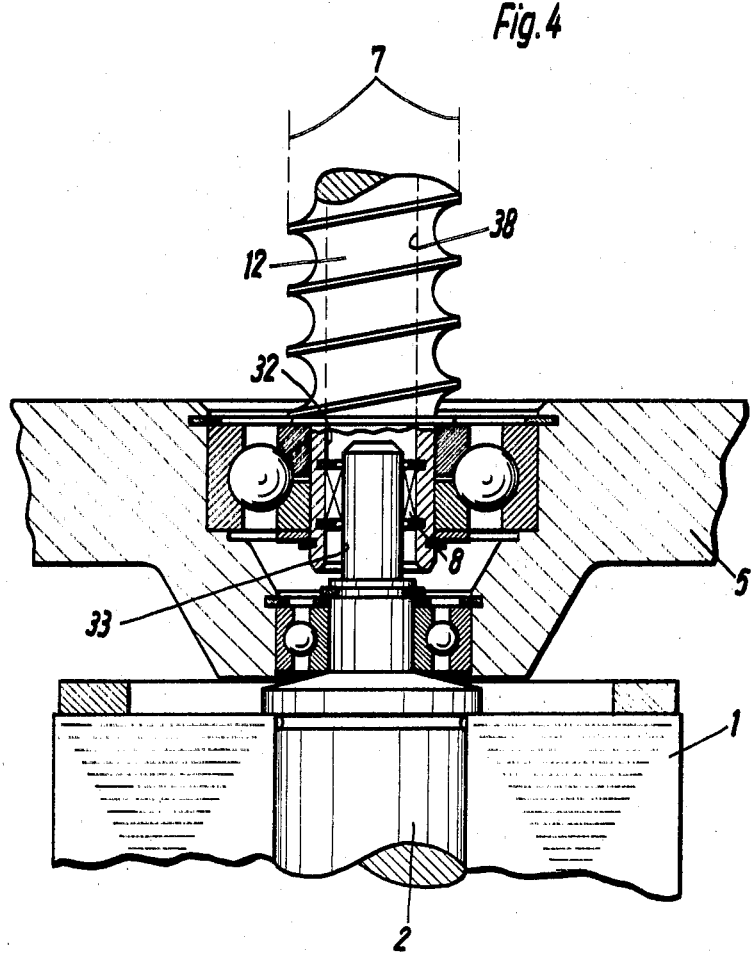
FIG. 4 shows a design which is similar to that of FIG. 3 but comprises a hollow screw.

Another modification is shown in FIG. 4 and is similar to that of FIG. 3 with the difference that the core bore 32 of FIG. 3 is replaced by a bore 38, which extends throughout the length of the screw 12, which is thus a hollow screw.

Other parts which are essential for the operation but are not significant for the purposes of the invention, such as oil scraper rings, labyrinth seals, rotor-supporting springs, end covers and screwed joints for end covers, filter supports, etc., are shown for the most part in the drawing but are not described here because they are not important.

The diagrammatic showings in FIGS. 5 to 10 are based on oscillographic records. Time is plotted on the axis of abscissae and the extent of the forward movement of the plunger of the brake-lifting device and of the movement of the brake rod linkage during the brake-applying operation is plotted along the ordinates in FIGS. 5, 7 and 9. The braking force is plotted on the axis of ordinates in FIGS. 6, 8 and 10 in per cent of the nominal braking force.

Figure 6:
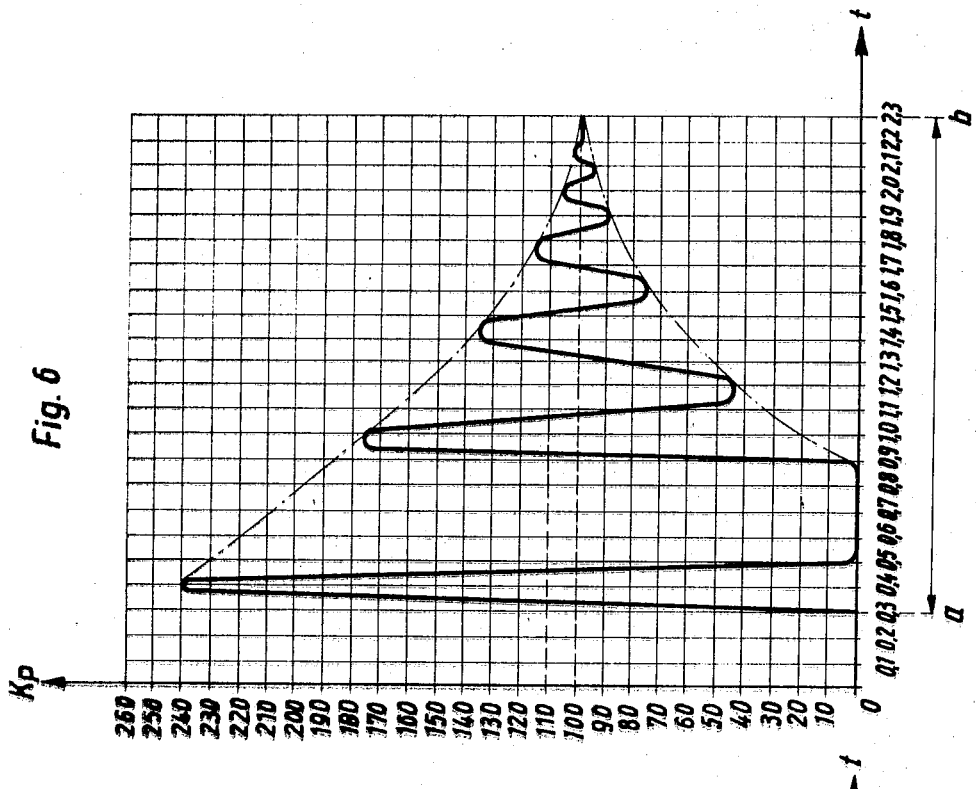
Figure 5:
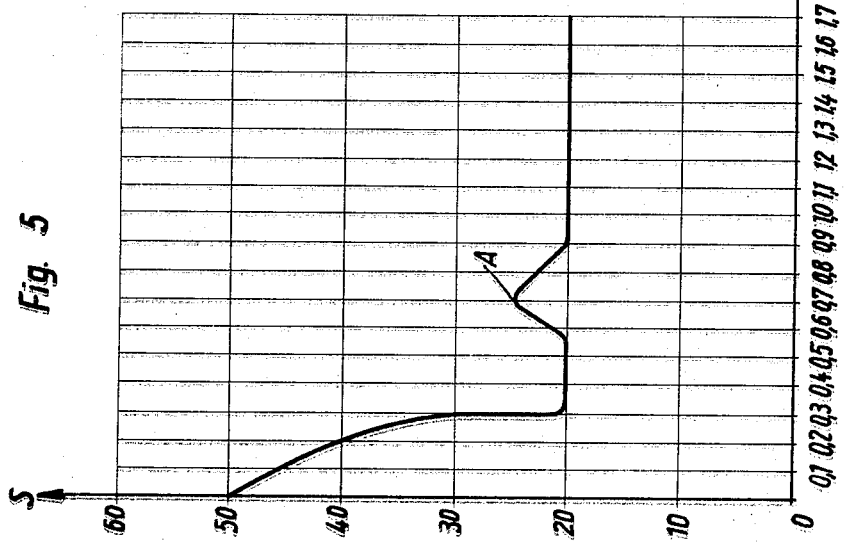

The brake-lifting devices which are known from the patent literature exhibit the behavior which is represented in FIGS. 5 and 6. It is apparent that an inadequate control of the gyrating masses and the absence of damping have the result that the moving system has a strong tendency to vibrate because the relaxing brake-applying compression spring imparts a movement to masses to such an extent that the kinetic energy of the moving masses is apparent from the amplitudes of the resulting vibration. A continuous periodic vibration would result in the absence of friction, which causes the vibration to become aperiodic, as shown. The vibration begins at the time when the brake shoes contact the brake drum and is maintained until the vibration has decayed. This vibration results in permanent chatter marks on the brake drum. The results of the vibration can also be seen from FIG. 5, which represents the resulting movements, as distinguished from FIG. 6. The results represented in FIG. 5 were obtained with a brake-lifting device having a total stroke of 50 millimeters. The brake rod linkage is so adjusted that a movement of 30 millimeters of the plunger from its fully extended position will cause the brake shoes to engage the brake drum. The remaining 20 millimeters serve to provide for the brake-applying compression spring of the brake-lifting device an initial stress in addition to the initial stress with which the spring is installed so that a wear allowance is available. The downwardly curved first section of the illustrated curve represents the displacement of the plunger as a function of the time required. This first section is succeeded by a hump A, which is due to the vibration shown in FIG. 6 and causes a visible lifting of the brake. It was thus known that lifting occurred but the causes of such lifting were not known. These causes are represented in FIG. 6.

FIGS. 7 and 8 show that the means previously proposed by the inventor to damp the vibration enabled an elimination of disadvantages which are apparent from FIGS. 5 and 6. Additional advantages were obtained, which can be recognized by a consideration of the interval between times $a$ and $b$ in FIG. 6, where $a$ is the time at which the braking force rises above zero and $b$ is the time when the brake shoes begin to apply the full static braking pressure. In FIG. 6 that interval $a-b$ still amounts to two seconds whereas the oscillogram of FIG. 8 shows that the transient time of the system has been reduced to about 600 milliseconds. The overshooting of the braking pressure is apparent from FIG. 6 and depends on the temperature of the device (resistance of lubricant) and on the adjusted plunger stroke. The two factors cannot be fully controlled. The resulting temperatures depend on the nature of the operation (port installations, metallurgical plants, cranes in general) and on the relative duty cycle etc. whereas the plunger stroke continuously changes as the brake shoes are worn. Hence, the overshooting cannot be exactly predicted although exact braking forces are required in cranes in order to enable predetermined accelerations and decelerations to be obtained without a shock. In this respect, the requirements to be fulfilled have not been fully met by the earlier proposals. FIG. 8 shows also vibration in that portion of the curve which represents overshooting so that it is an additional object to eliminate also this vibration, which is due to the fact that the operation of a freewheel in the freewheeling direction results in a residual torque amounting to about 10 percent of the full torque, whereas it was generally believed that a freewheel transmits only zero torque in the freewheeling direction. Because the masses of the known freewheels are too large to be neglected, this residual torque gives rise to the above-mentioned vibration and the latter cannot be avoided unless the residual torque is entirely eliminated and the mass of the freewheel is substantially eliminated.

Figure 10:
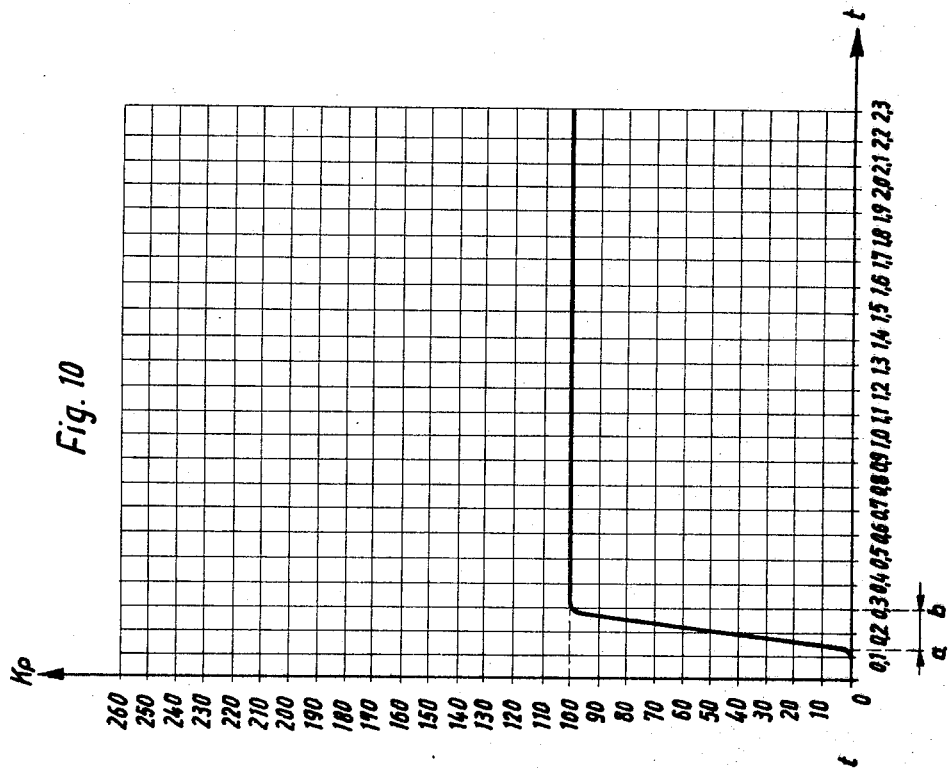
Figure 9:
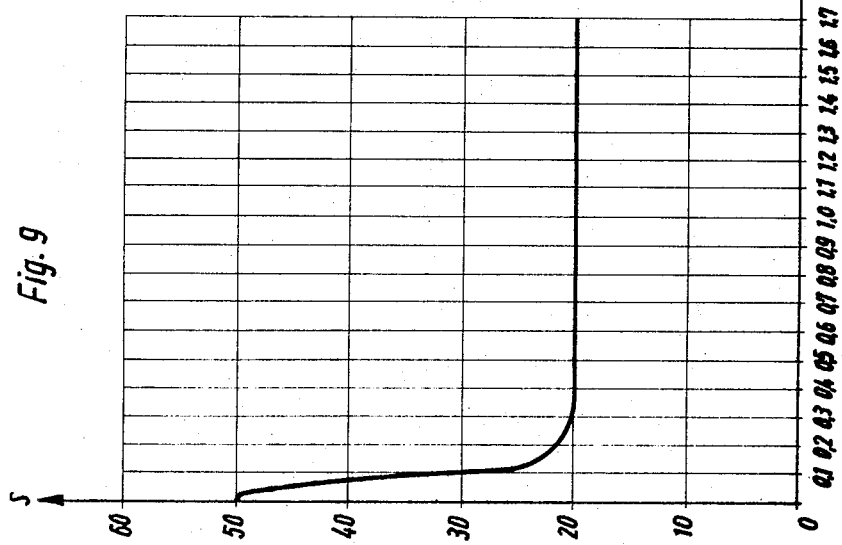

It is apparent from FIGS. 9 and 10 that this is enabled by the means provided according to the invention. FIGS. 9 and 10 represent virtually ideal time, force and motion curves and indicate additional technical advantages in that the braking force rises above zero after 120 milliseconds. The interval $a-b$ has been reduced to 200 milliseconds.

Figure 11:
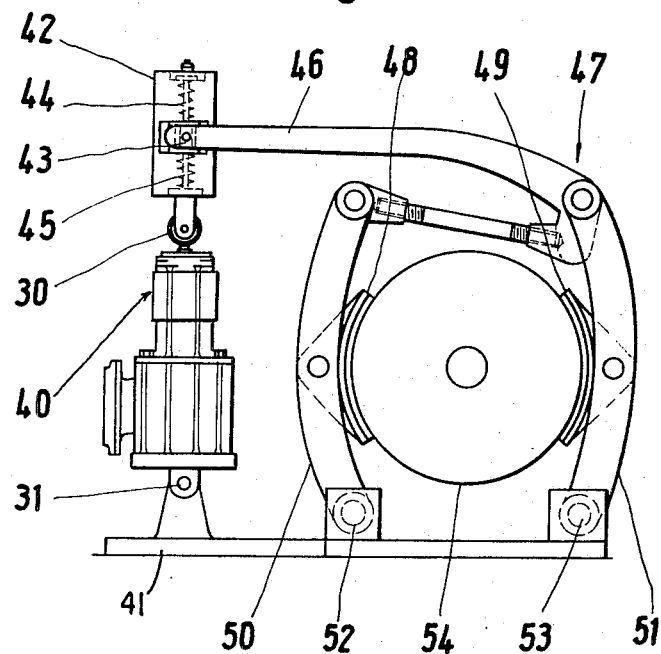
FIG. 11 shows diagrammatically the brake-lifting device of FIG. 1 in a braking arrangement for a crane for metallurgical operations and FIG. 12 illustrates a freewheel clutch used in accordance with the invention.

FIG. 11 shows a brake-lifting device 40 in a braking arrangement such as is conventional, e.g., in crane installations in metallurgical works, e.g., for lifting and lowering a ladle filled with molten iron or molten steel. In such operation the ladle must be moved to predetermined end positions in the hook fittings of the hoisting tackle without vibration or shock and to an accuracy of one millimeter. This object can be accomplished with the aid of a brake-lifting device 40 according to the invention. That brake-lifting device is linked to a common foundation plate 41 of the braking arrangement by the lower connecting eye 31 (FIG. 1). A so-called regulating spring set 42 is connected to the upper eye 30 of the plunger 12, 17 of the brake-lifting device 40 and comprises two springs 44, 45, which cooperate with the articulated joint 43 like a spring balance. The articulated pivot joint 43 connects a shifting member 46 of the brake rod linkage 47 to the motor-driven brake-lifting device 40. The brake rod linkage comprises shifting arms 50, 51, which carry the brake shoes 48, 49 and are connected by pivots 52, 53 to the foundation 41. To apply the brake, the relaxing spring 18 (see FIG. 1) urges the brake shoes 48, 49 against the brake drum 54. A starting of the motor 1 of the motor-driven brake-lifting device shown in FIG. 1 will lift the brake shoes 48, 49 from the brake drum 54 to release the latter. Such brake rod linkage is known so that its other details need not be described.

Figure 12:
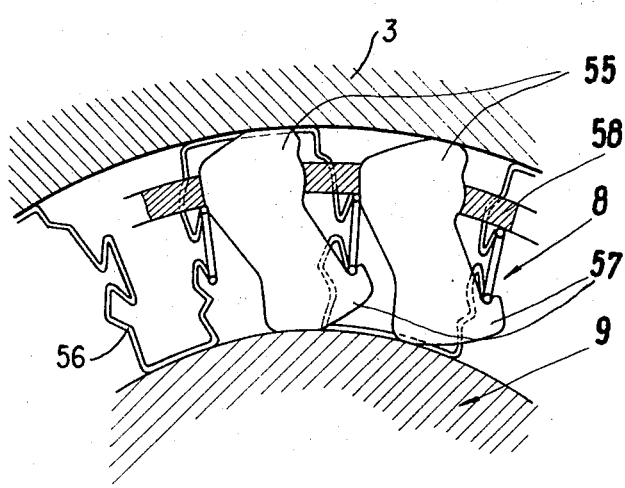

FIG. 12 is a diagrammatic sectional view taken on line XII-XII in FIG. 2 and showing the design of a freewheel clutch used in accordance with the invention. The section is taken in a plane at right angles to the axis of journal 9. Drag wedges 55 are loosely inserted in a retainer 58 and form freewheeling coupling elements in contact with the shaped wire spring 56. A shaped wire spring contacts a shoulder 57 of each drag wedge 55 to move the same to a coupling position when the parts 3, 9 move relative to each other in a clockwise sense. Parts 9, 3 will be relatively uncoupled for a free-wheeling operation when their relative movement is in the counterclockwise sense. FIG. 12 shows the structure on a much larger scale than FIG. 2. The drag wedges are actually like needles having longitudinal axes which are parallel to the center line of the pin 9.

The invention is also directed to individual ones of the features that have been described hereinbefore as well as to their overall combination and to all those combinations of parts of such features which are technical useful and practicable, even though the new technical results produced by such combinations may not have been mentioned and specifically described hereinbefore. Besides, all details shown in the drawing are considered described as such and in their functional relation.

What is claimed is:

1. An electromechanical shifting device for shifting at least one shifting member, said device comprising, in combination, support means; a motor connected to said support means and having a motor shaft; a reciprocatable member connected to said shifting member; transmission means between said motor shaft and said reciprocatable member for transforming rotational movement of said shaft into linear movement of said reciprocatable member, said transmission means comprising a screw having male screw threads, and nut non-rotatably arranged about the screw and having female screw threads surrounding said male screw threads and defining with the latter a helical guide path, rolling elements disposed in said guide path and arranged to continuously move in and along said guide path, through the same and back into said guide path for coupling said male to said female screw threads; a freewheel clutch disposed between said motor shaft and said screw and arranged to rigidly couple said motor shaft and said screw for rotation in one direction and to uncouple said motor shaft and said screw for relative rotation in the opposite direction, the outer periphery of said wheel of said free wheel clutch substantially coinciding with the periphery of an imaginary cylinder which is contiguous with the crests of said male screw threads; and shock absorbing means disposed between said support means and said shifting member.

2. A shifting device as set forth in claim 1, in which said motor shaft comprises a pot-shaped end portion having a cylindrical inner boundary surface which is substantially an imaginary extension of said periphery of said imaginary cylinder which is contiguous to the crests of said male screw threads, said screw having an end journal which is smaller in cross-section then the core of said screw formed with said male screw threads, said end journal extending into the cavity of said pot-shaped end portion of said motor shaft, said freewheel clutch being disposed between said end journal and said inner boundary surface of said pot-shaped end portion of said motor shaft.

3. A shifting device as set forth in claim 1, in which said screw has a core bore having a cylindrical inner boundary surface which is substantially an imaginary extension of the periphery of said imaginary cylinder which is contiguous with the crests of said male screw threads, said motor shaft has an end journal which is smaller in cross-section than the rest of the motor shaft and extends into said core bore, and said freewheel clutch is disposed between said end journal of said motor shaft and said inner boundary surface of the core bore of the screw.

4. A shifting device as set forth in claim 1, in which said screw is hollow and has an inner boundary surface which is substantially an imaginary extension of the periphery of said imaginary cylinder which is contiguous with the crests of said male screw threads, said motor shaft has an end journal which is smaller in cross-section than the rest of the motor shaft and extends into the interior of said hollow screw, and said freewheel clutch is disposed between said end journal of said motor shaft and said inner boundary surface of said screw.

5. A shifting device as set forth in claim 1, in which said revolving elements consist of balls.

6. A shifting device as set forth in claim 1, in which said freewheel clutch comprises needlelike freewheeling elements which are small in cross-section relative to their length.

7. A shifting device as set forth in claim 1, in which said shifting member is a part of a brake-applying and brake-lifting linkage of a braking device, and which comprises a spring, which is adapted to store energy as a result of the operation of the motor and to use said energy for a brake-applying operation when said spring is allowed to relax, said plunger being operable to perform said working movement in a brake-lifting direction.

8. A shifting device as set forth in claim 1, wherein said reciprocatable member comprises a plunger including a pot-shaped member, said nut being arranged in said pot-shaped member and including means guiding said plunger for rectilinear movement, and resilient means between said guide means and said plunger for moving the latter in a direction opposite to which the plunger is moved by said motor.

* * * * *